United States Patent
Dickerson et al.

(10) Patent No.: US 7,950,607 B1
(45) Date of Patent: May 31, 2011

(54) SMALL MUNITIONS ADAPTOR RACK FOR RELEASING SMALL MUNITIONS FROM AN AIRCRAFT

(75) Inventors: Michael L Dickerson, Simi Valley, CA (US); Ketan R. Shah, Cerritos, CA (US)

(73) Assignee: Carleton Technologies, Inc., Orchard Park, NY (US)

( * ) Notice: Subject to any disclaimer, the term of this patent is extended or adjusted under 35 U.S.C. 154(b) by 950 days.

(21) Appl. No.: 11/401,526

(22) Filed: Apr. 10, 2006

(51) Int. Cl.
*B64D 1/12* (2006.01)
(52) U.S. Cl. .................................... 244/137.4
(58) Field of Classification Search ............... 244/137.4, 244/137.1; 89/1.53, 1.54; 294/82.29, 82.26, 294/82.24, 88
See application file for complete search history.

(56) References Cited

U.S. PATENT DOCUMENTS

| | | | |
|---|---|---|---|
| 3,677,506 A | | 7/1972 | La Roe |
| 4,075,929 A | | 2/1978 | Peterson |
| 4,412,475 A | * | 11/1983 | Hornby ........................ 89/1.816 |
| 4,620,680 A | * | 11/1986 | Hasquenoph et al. ..... 244/137.4 |
| 4,829,876 A | * | 5/1989 | Witt ............................... 89/1.53 |
| 4,850,553 A | | 7/1989 | Takata et al. |
| 5,904,323 A | | 5/1999 | Jakubowski, Jr. et al. |
| 6,073,886 A | | 6/2000 | Jakubowski, Jr. et al. |
| 6,655,254 B1 | * | 12/2003 | Nicodemus ..................... 89/1.54 |
| 7,083,148 B2 | * | 8/2006 | Bajuyo et al. .............. 244/137.4 |

* cited by examiner

*Primary Examiner* — Tien Dinh
(74) *Attorney, Agent, or Firm* — Jaeckle Fleischmann & Mugel LLP

(57) ABSTRACT

An adapter for converting a full size aircraft bomb rack into a rack capable of supporting reduced size bombs or stores. The full size bomb rack includes a bomb ejection mechanism capable of delivering an ejection force to a full size bomb. The adapter includes an elongated plate having a body portion defining a planar center portion and end portions. The end portions include laterally extending sway braces for reducing lateral swaying of the reduced size store or bomb. The adapter plate is mounted between the reduced size store and the full size adapter rack. The body portion of the adapter rack includes apparatus for ejecting a reduced size store from the elongated plate. A first opening is arranged adjacent to one end portion of the elongated plate for receiving fasteners carried by the reduced size store which attach the store to the full size bomb rack. These fasteners are passed through an opening in the elongated plate. An ejection mechanism at an end of the elongated plate operates to transfer the ejection force from the full size bomb rack to the store.

10 Claims, 3 Drawing Sheets

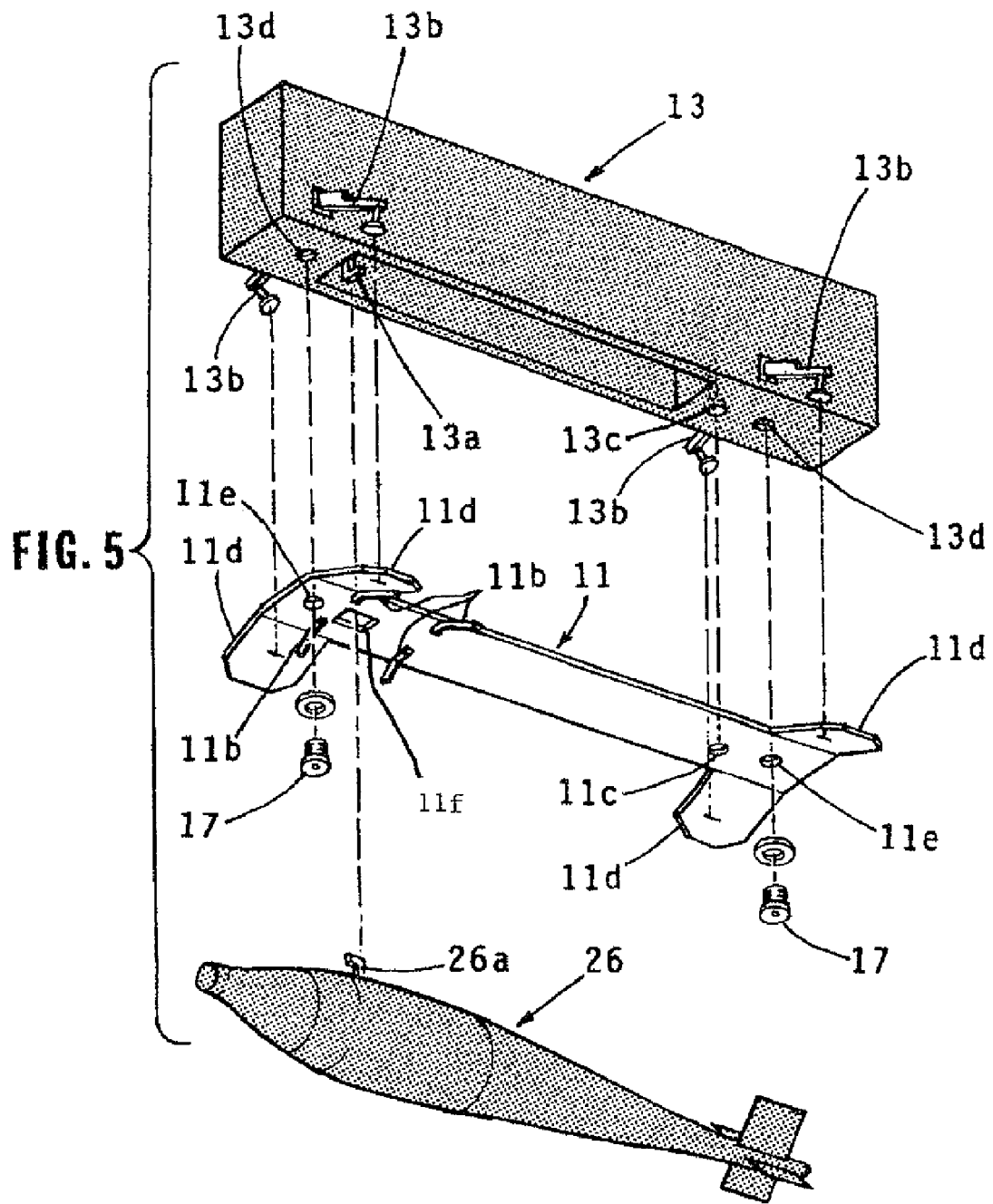

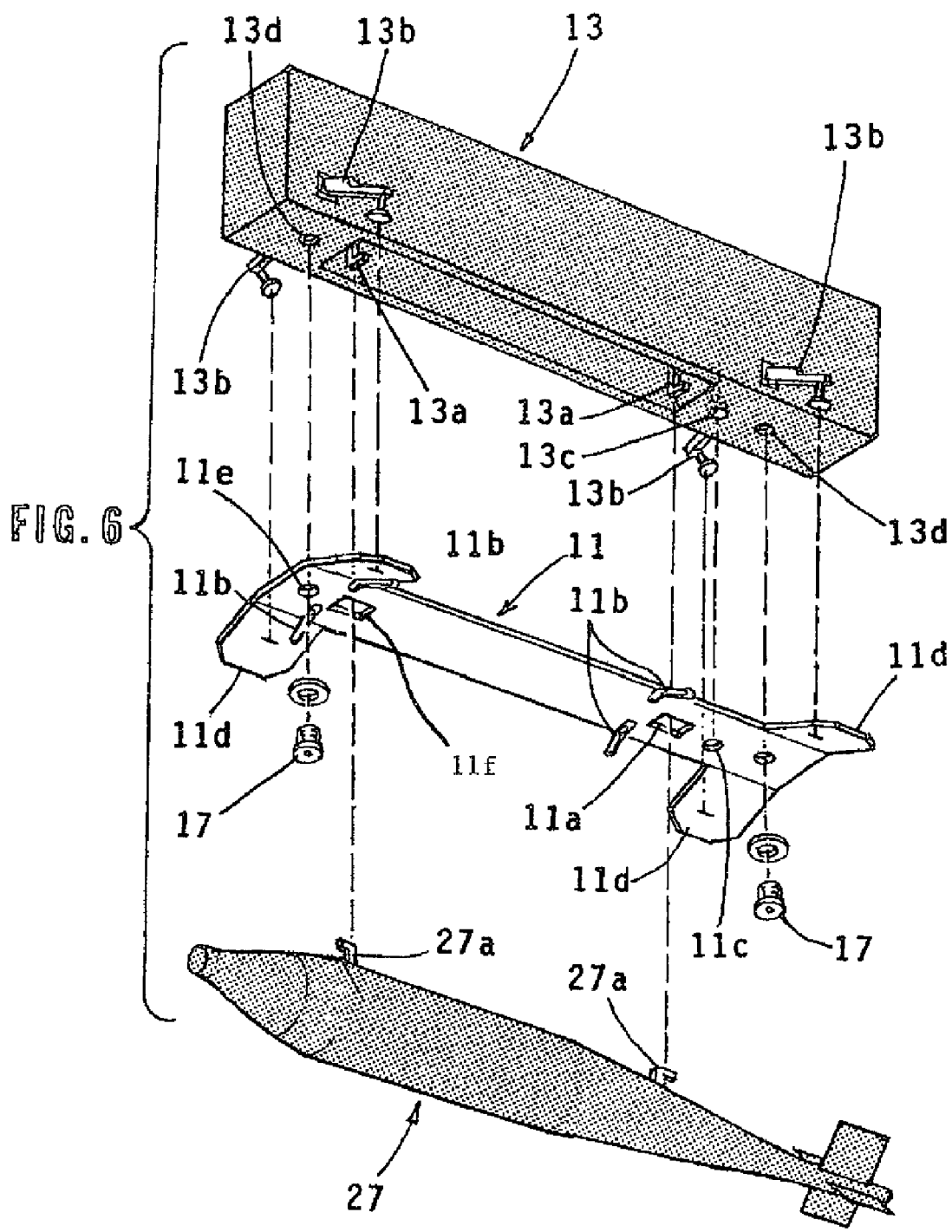

SMALL MUNITIONS ADAPTOR RACK FOR RELEASING SMALL MUNITIONS FROM AN AIRCRAFT

BACKGROUND OF THE INVENTION

1. Field of the Invention

The present invention relates to bomb or store racks for underwing attachment to an aircraft, and more particularly to an adapter rack designed for attachment to conventional full size main rack on an aircraft and for supporting bombs or stores of smaller size and weight than conventional bombs or stores.

2. Description of Related Art

The use of racks for carrying cargo, such as bombs or stores, adapted for attachment to the underside of an aircraft wing or fuselage is well known in the art. Typically, such racks consist of a support member, a cargo receiving member secured to the support member and articulated to facilitate orientation of the cargo receiving member to different positions in order to enable cargo of different sizes to be snugly secured against the support member, and a pneumatically-driven or hydraulically-driven ejection piston for driving the support member from a retracted position to an extended position and thereby force release of the cargo.

Typical racks for aircraft are able to support bombs or stores that may weigh on the order of about 1000 pounds. Bombs or stores of significantly less weight, on the order of 100 pounds in weight or less, are used in practice maneuvers to cut down on the expense involved. There may also be situations where low weight conventional bombs, or air-lifted stores for use on the ground, may be employed. In the past, in order to handle such smaller cargo, separate racks for the larger and smaller weight items have been required. The use of such a secondary rack in conjunction with the primary rack does not accurately simulate the dropping of a bomb from the primary rack. Further, this secondary rack is about as large as the primary rack and is difficult to maintain, clean and load.

Prior art full-size aircraft racks are designed for supporting heavy cargo, such as stores, bombs, and missiles. Such prior art racks are described in U.S. Pat. No. 4,850,553 issued Jul. 25, 1989 to Takata et al.; U.S. Pat. No. 3,677,506 issued Jul. 18, 1972 to La Roe; U.S. Pat. No. 5,904,323 issued May 18, 1999 to Jacubowski, Jr. et al.; and U.S. Pat. No. 6,073,886 issued Jun. 13, 2000 to Jacubowski, Jr. et al, and are incorporated herein by reference.

U.S. Pat. No. 5,904,323 to Jakubowski, Jr. et al. discloses a store release system which includes a support member, a store-nesting facility secured to the support member and articulated to enable orientation of the store-nesting facility to different positions to permit stores of different sizes to be nested thereagainst, and an ejection mechanism, such as a pneumatically or hydraulically driven piston, for driving the support member from a retracted position to an extended position. When the piston is moved to the extended position, the store can be released.

U.S. Pat. No. 6,073,886 to Jakubowski, Jr. et al. discloses an actuator assembly that includes telescoping housings that have relatively constant net pressure during the entire telescoping stroke, so that the force required to effect the telescoping movement, and hence the motion, are smooth and constant.

U.S. Pat. No. 3,677,506 to La Roe discloses a hook structure for supporting a bomb or store on a carrying vehicle such as an aircraft.

U.S. Pat. No. 4,850,553 to Takata et al. discloses an ejector arrangement for aircraft store racks in which two ejector mechanisms are coupled for synchronized movement to ensure ejection of the store from the rack during flight at speeds in excess of Mach 1.

The device of the present invention overcomes the shortcomings of the prior art by providing a relatively simple adaptor rack which is adapted to be attached to the regular full size main rack. The adaptor rack has a substantially planar adapter plate which is attached to the regular bomb rack by attachment means, such as bolts, such that venting of the pistons of the main rack is not defeated. In fact, pressurized gases released by the ejection pistons of the main rack cooperate with valve means carried by the adapter rack to effect ejection of a small size cargo carried by the adapter rack. The adapter plate has laterally extending arms that provide a rest place for active or passive sway braces that provide stability and protection for small cargo, such as munitions or stores. Further, the adapter rack of the present invention can easily be installed by a single person in a short time period.

SUMMARY AND OBJECTS OF THE PRESENT INVENTION

It is therefore an object of the present invention to provide a relatively small adapter rack outfitted for attachment to a full size under wing aircraft rack typically used in supporting bombs or stores, in which the adapter rack, which is capable of supporting reduced-size bombs or stores, can be inserted between the full-sized aircraft rack and the reduced-size adapter rack.

Another object of the present invention is to provide a device that will permit a full-sized aircraft rack to be converted into an aircraft rack that can carry a reduced-size bomb or store, wherein the device is an adapter element that includes an elongated body having laterally extending arms at opposite ends of the body for stabilizing a bomb or store carried beneath the adapter element.

Another object of the present invention is to provide an adapter for converting a full-size aircraft rack into a rack capable of carrying reduced-size stores or bombs, where the adapter is secured to the full-size rack between the reduced-size cargo and the full-size aircraft rack in such a manner that the ejection means of the full-size aircraft rack is in registry with an ejection means carried by the adapter.

Still another object of the present invention is to provide an adapter for allowing a full size aircraft rack to be outfitted with reduced-size cargo, such as stores or bombs, where the adapter includes sets of laterally extending arms that act as stabilizing swaybraces for keeping the cargo from excessive movement during flight of the aircraft.

Still further objects and advantages will become apparent from a consideration of the following drawings in connection with the accompanying description.

BRIEF DESCRIPTION OF THE DRAWINGS

FIG. 5 is an exploded perspective view of the preferred embodiment; and

FIG. 6 is an exploded perspective view of a second embodiment of the invention.

DETAILED DESCRIPTION OF THE INVENTION

Figure 1:
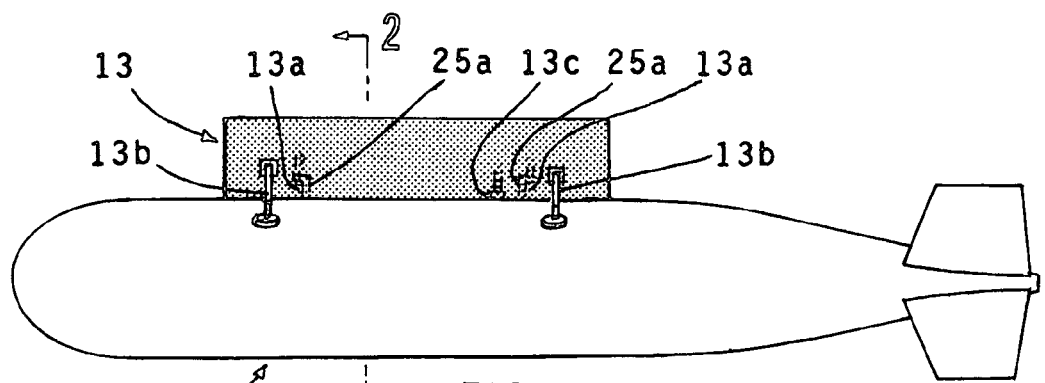
FIG. 1 is a side elevational view of a prior art bomb rack.
Figure 2:
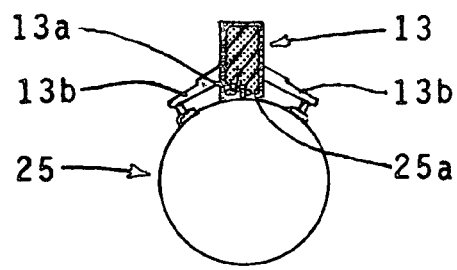
FIG. 2 is a cross-sectional view taken along the plane indicated by 2-2 in FIG. 1.

Referring now to FIGS. 1 and 2, a typical prior art bomb rack for carrying heavy bombs (1,000-5,000 pounds) is schematically illustrated. L-shaped hooks 13a are fixedly mounted on bomb rack 13. Hooks 13a engage lugs 25a fixedly attached to bomb 25 and lift the bomb upwardly against the rack. Sway braces 13b are mounted on rack 11 and Are firmly seated against the surface of the bomb. The bomb is released by actuating a control switch to apply pressurized gas against the surface of the bomb through orifices 13c. This pressurized gas, which is at a high pressure, drives the lugs on the bomb off the hooks on the rack, thereby dropping the bomb. Typically, the pressurized gas is converted to an ejection pulse through the use of conventional piston-type ejection devices that push against the surface of the bomb.

Figure 3:
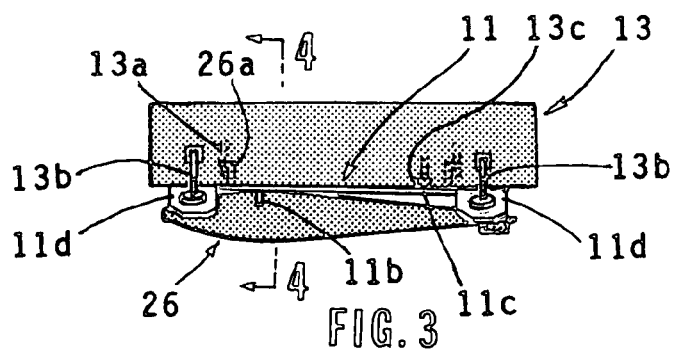
FIG. 3 is a side elevational view of a preferred embodiment of the invention.
Figure 4:
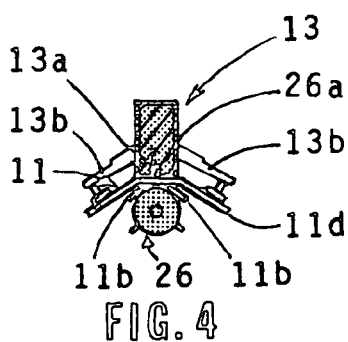
FIG. 4 is a cross-sectional view taken along the plane indicated by 4-4 in FIG. 3.

Referring to FIGS. 3-5, a preferred embodiment of the invention is illustrated. As previously noted, the device of the invention is for use with lightweight bombs or other loads of the order of 100 pounds in weight.

The device of the invention comprises an adaptor rack 11 which is attached to the main rack 13 supported on the aircraft. The adaptor rack 11 has a substantially flat plate, which is fixedly supported on the main rack 13 by means of bolts 17. The plate of the adaptor rack 11 defines a plane at the opposite ends of which are laterally extending sway braces 11d. Valve 11c is mounted in an aperture in plate 11 and kept almost fully closed. The valve 11c is coupled to the output of the ejector piston of the main rack and provides gas at minimum pressure, which is sufficient for deploying the bomb 26. A support lug 26a is mounted on the bomb 26, and fits through a first opening 11f in the plate and engages hook 13a on the main rack 13 to support the bomb. Support brackets 11b are fixedly mounted on the plate of rack 11 and keep the bomb from swaying.

The adapter rack of the invention is connected to the conventional full-sized rack 13, which is also a store rack. As previously noted, the adapter rack is secured to the main store rack by means of bolts 17. Further, as previously noted, valve 11c is connected to the output of the ejector piston of the main rack 13. Valve 11c is set to permit only very low pressure gas to pass therethrough so that damage to the bomb, store or rack adaptor is obviated. Support hook 26a is fixedly attached to bomb 26 and fits through a hole formed in the plate of adaptor rack 11 engaging lug 13a formed on the rack 13.

Sway braces 11d are attached to the sides of the rack 11 and operate to reduce the swaying of the bomb. The sway braces rest on sway brace supports 13b, which are pivotally mounted on the main rack. The sway brace supports are tightened against the sway braces to assure stability of the bomb or store. Four ears 11b mounted on rack 11 operate to further stabilize the bomb.

In the deployment of the bomb or store 26, the pistons of the main rack are actuated by an electrical control and lower pressure gas is provided to valve 11c so that the bomb or store 26 is pushed away from the open hooks thereby deploying the bomb. The small munitions adaptor rack (SMA) 11 stays attached to the main rack and is retracted back to the main rack when the pressure of the piston vents. A key factor in getting the SMA to function with the main rack made for large bombs or store is to set the pitch orifices 13c and/or valves 11c close to the closed position. This limits the pressure of the pistons to leakage pressure, which is considerably lower than the full 5100 psi available. With too high a pressure setting, the force on the pistons could destroy the SMA and a small store.

When the pilot sends an electrical signal to fire the store or bomb 26, the signal causes hook 13a to rotate so that it is released from the lug 26a on the store or bomb. Pressurized gas is fed to the ejector valve 11c. The force of the gas emitted by the valve drives the bomb or store 26 off the adaptor rack with the adaptor rack remaining attached to the main rack.

Referring now to FIG. 6, a second embodiment of the invention is illustrated. This embodiment is adapted for use with heavier practice missiles and loads. This embodiment is the same as the first embodiment except for the addition of another lifting hook 13a which passes through an additional aperture 11a in the adaptor rack and engages an additional lug 27a on the bomb. In addition, a second pair of ears 11b are mounted on the adaptor plate 11 to provide additional stabilization for the bomb 25.

The present invention thus provides a simple and efficient system for installing an adaptor for handling small bombs and other light loads on an existing prior art bomb rack.

While the invention has been described and illustrated in detail, it is to be clearly understood that this is by way of illustration and example only and not by way of limitation, the spirit and scope of the invention being limited by the following claims:

We claim:

1. An adaptor for converting a full-size aircraft bomb rack into a rack capable of supporting and releasing reduced-size stores, said full-size bomb rack including bomb ejection means capable of delivering an ejection force to the full-size bomb, said adapter comprising:
    an elongated plate having a body portion defining a plane and opposing end portions, said end portions including laterally extending sway braces for reducing lateral swaying of the reduced-size store, said plate being mounted between the reduced-size store and the full-size aircraft bomb rack, said body portion further including means for ejecting a reduced-size store from the elongated plate,
    a first opening adjacent one end portion of the elongated plate for receiving securing means carried by the reduced-size store for attaching said store to the full-size bomb rack, whereby the securing means can be passed through the opening and engaged with a corresponding support element on the full-size bomb rack,
    an ejection mechanism at the opposite end of the elongated plate for transferring the ejection force from the full-size bomb rack to the reduced-size store, and
    means for securing the plate to the full-size aircraft bomb rack.

2. The adapter of claim 1, and further including a first set of laterally extending ears on said elongated plate disposed adjacent the opening, the ears acting to stabilize the reduced-size store when the latter is mounted to the adapter plate.

3. The adapter of claim 2, wherein the first set of ears comprises two ears arranged normal to the elongated plate and extending in opposite directions.

4. The adapter of claim 2, and further including a second set of ears carried by the elongated body of the adapter, said ears providing additional stability for a reduced-size store carried by the adapter.

5. The adapter of claim 4, wherein said second set of ears comprises two ears arranged normal to the elongated plate and extending in opposite directions.

6. The adapter of claim 5, wherein said second set of ears is disposed in the vicinity of said first opening.

7. The adapter of claim 5, wherein said second set of ears is disposed in the vicinity of said second opening.

8. The adapter of claim 1, and further including a second opening adjacent the second opposite end portion of the elongated plate for receiving securing means carried by the rear end of a full-size store for attaching the full-size store to the full-size bomb rack, the full-size bomb rack having a front end and a rear end and the securing means of the full-size store being able to be passed through the second opening and securing to the full-size bomb rack.

9. The adapter of claim 1, wherein said ejection mechanism comprises a valve that is aligned with the ejection means on the full-size bomb rack.

10. The adapter of claim 1, wherein the store is a bomb.

* * * * *